No. 617,764. Patented Jan. 17, 1899.
E. F. OBENCHAIN.
BALL BEARING.
(Application filed Apr. 18, 1898.)

(No Model.)

Witnesses:
E. R. Shipley.
M. S. Belden.

Elder F. Obenchain
Inventor by James W. See
Attorney

UNITED STATES PATENT OFFICE.

ELDER F. OBENCHAIN, OF LOGANSPORT, INDIANA.

BALL-BEARING.

SPECIFICATION forming part of Letters Patent No. 617,764, dated January 17, 1899.

Application filed April 18, 1898. Serial No. 677,917. (No model.)

*To all whom it may concern:*

Be it known that I, ELDER F. OBENCHAIN, of Logansport, Cass county, Indiana, have invented certain new and useful Improvements in Ball-Bearings, (Case B,) of which the following is a specification.

This invention pertains to improvements in ball-bearings adapted for use where a shaft turns in a supporting-box or where a hub turns on a supporting-shaft.

The improvements will be readily understood from the following description, taken in connection with the accompanying drawings, in which—

Figure 1:
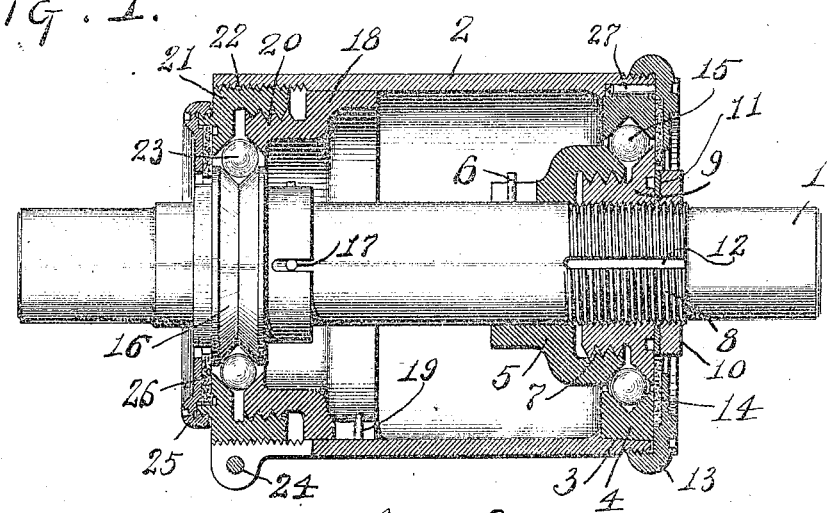
Figure 2:
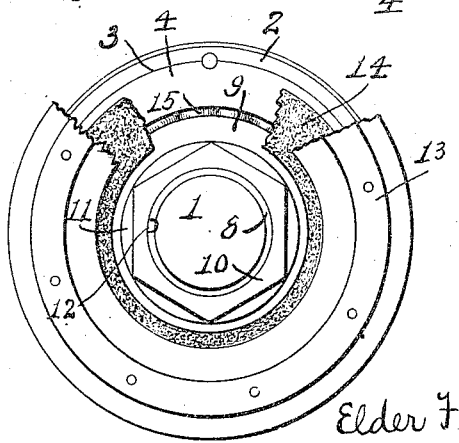

Figure 1 is a vertical longitudinal section of a ball-bearing embodying my improvements; and Fig. 2 is an end view of the same, the view corresponding with the right-hand end of Fig. 1, parts being broken away to expose construction beyond them.

In the drawings, 1 indicates a shaft, which may be rotary or stationary, according as the shaft is to turn within a supporting-box or to have a hub turn upon and be supported by it; 2, a shell concentrically surrounding the shaft and forming the supporting-box in case the shaft is the rotary element and forming a hub in case the shaft is the stationary element; 3, a counterbore in the right-hand end of shell 2, this counterbore being, preferably, somewhat tapering; 4, a ring fitting within this counterbore and having its interior wall provided with a circumferential V-shaped groove, the ring thus forming a V-shaped ball-race; 5, a collar fitting upon shaft 1 within the shell and capable of sliding motion upon the shaft, the outer end of this collar coming within ring 4 and being beveled to form one member of an interior ball-race to coöperate with ring 4; 6, a pin in shaft 1 engaging a slot in collar 5 and forming exemplifying means for causing the collar to maintain constant angular relationship to the shaft without interfering with its capacity for limited sliding motion thereon; 7, a threaded counterbore in the outer end of collar 5, this thread having a pitch of, say, ten to the inch; 8, a thread upon the shaft outwardly beyond collar 5 and having a pitch one-half that of thread 7, or in the example given twenty to the inch; 9, a collar screwed upon thread 8 and screwing into thread 7, the outer portion of this collar being flanged to form the second member of the interior ball-race, whose first member is formed by collar 5, collars 5 and 9 together thus forming an interior V-shaped ball-race in line with that formed by ring 4; 10, a lock-nut screwed upon thread 8 exterior to thread 9 and serving in locking collar 9 in adjusted position upon thread 8; 11, a thin washer interposed between collar 9 and its lock-nut 10; 12, a longitudinal groove in threads 8, engaged by a suitable tongue in the bore of washer 11, whereby washer 11 is prevented from turning upon the shaft when the lock-nut is turned; 13, a cap screwed to the end of shell 2 and flanged inwardly exterior to ring 4; 14, a washer, of felt or similar soft material, clamped between the flange of cap 13 and the outer face of ring 4 and projecting inwardly over the outer face of collar 9, and 15 a circular series of balls engaging the ball-races formed by ring 4 and collars 5 and 9.

Considering the device as thus far described, it will be observed that balls 15 have axes of rotation parallel with each other and parallel with the axis of shaft 1. If lock-nut 10 and washer 11 be removed, then, with a suitable spanner, collar 9 may be screwed inwardly upon thread 8, the effect of which screwing is to move collar 9 to the left. At the same time thread 7 will draw collar 5 to the right, the result being that collars 9 and 5 are drawn closer together, thus taking up the looseness of the ball-races and securing that delicate degree of touch-and-go tightness which is desired in a properly-working ball-bearing. When collar 9 is thus screwed inwardly, it carries its thread 7 also bodily inwardly; but as that thread has double the pitch of thread 8 it follows that collar 5 will be drawn to the right the same distance as collar 9 moves to the left, whereby the root of the interior ball-race formed by members 5 and 9 is constantly maintained in the plane of the root of the ball-race formed by ring 4, a given endwise relationship of the shaft to the shell thus being constantly maintained undisturbed by adjustment of the ball-races to compensate for wear. If collar 9 be unscrewed from thread 8 it will move to the right, and simultaneously collar 5 will move an equal distance to the left until collar 9 disengages from thread 7, after which collar 9 may be moved from the shaft, cap 13 being of course first removed. Lock-nut 10 serves in locking collar 9 after adjustment, and washer 11, being splined to the shaft, prevents the setting up of lock-nut 10 from disturbing the angular position of collar 9.

Washer 14, clamped against ring 4 and bearing gently against collar 9, prevents access of dust to the ball-races. Pin 27, engaging half in ring 4 and half in the counterbore of shell 2, prevents the rotation of the ring within the shell. By removing cap 13 shaft 1 may be withdrawn to the right from the shell, bringing the balls and ring 4 with it, the entire right-hand portion of the ball-bearing thus coming away with the shaft as one piece without disturbing the adjustment of the interior ball-race and without danger of dropping the balls.

Now giving consideration to the left hand of the structure, 16 indicates a collar fitted upon the shaft and capable of sliding motion thereon, its periphery forming a V-shaped interior ball-race; 17, pins in the shaft engaging slots in collar 16 and serving to maintain angular relationship between shaft and collar, while permitting them to slide with reference to each other; 18, a ring fitting within the shell and capable of sliding therein, the outer end of this ring being beveled to form the inner member of an exterior ball-race to coöperate with collar 16; 19, a pin in the shell engaging a slot in ring 18 to hold the ring in angular relationship to the shell, while permitting them to slide with reference to each other; 20, a thread upon the outer nose of ring 18 and having a pitch of, say, ten to the inch; 21, a ring screwing upon thread 20 of ring 18 and having an inwardly-projecting flange beveled to form the second member of the exterior ball-race, whose first member is formed by ring 18; 22, threads upon the exterior of collar 21 and upon the interior of the shell and having a pitch half that of thread 20, or in the case given twenty to the inch; 23, a series of balls engaging the ball-races formed by collar 16 and by collars 18 and 21; 24, a clamp-bolt across a longitudinal slit in the left-hand end of the shell and serving in well-known manner as a binder between collar 21 and the shell to hold the collar in adjusted position; 25, a cap screwed upon the exterior face of collar 21 and having an inwardly-projecting flange; 26, a washer, as of felt, clamped against the outer face of collar 21 by cap 25 and projecting inwardly to engage the outer face of collar 16, and 27 the pin heretofore referred to in connection with the right-hand end of the structure.

The adjustment of the left-hand ball-races to compensate for wear, &c., is by differential thread the same as in the former case, the differential threads in this case, however, being provided at the exterior ball-race instead of upon the interior one. It is to be observed that the shaft can slide endwise with reference to collar 16, pin 17 permitting this. It follows that the endwise position of shaft with relation to shell being fixed by the plane of balls 15, whose exterior race is longitudinally fixed in the shell and whose interior race is longitudinally fixed on the shaft and the plane of balls 23 being fixed by their exterior race longitudinally fixed to the shell, interior race 16 may take its own position on the shaft and come into proper alinement with balls 23, thus avoiding the necessity for delicate adjustment of the relationship of the two ends of the structure to each other and also avoiding any evils which might otherwise be due to expansion and contraction. It is also to be observed that when the shaft is withdrawn to the right, as has been explained, it becomes withdrawn entirely from collar 16, thus leaving the left-hand portion of the structure undisturbed in its adjustment and guarding against the dropping out of the balls.

I claim as my invention—

1. In a ball-bearing, the combination, substantially as set forth, of a shell, a shaft, two members of a divided V-grooved ball-race adjustably secured within one end of the shell, a series of balls in said race, a V-grooved interior ball-race engaging said balls and having sliding engagement with said shaft, a V-grooved ball-race separably secured in the opposite end of said shell, a series of balls in said last-mentioned ball-race, and two members of a divided V-grooved ball-race engaging said last-mentioned balls and adjustably secured to said shaft, whereby said shaft accompanied by one series of its balls and their races may be removed from the shell without disturbance of the adjustment of the ball-races, leaving the other series of balls and their races in the shell in undisturbed condition of adjustment.

2. In a ball-bearing, the combination, substantially as set forth, of a shaft, a shell, a divided V-grooved ball-race adjustably secured to the shaft, a series of balls engaging said race, a V-grooved ring engaging said balls and fitting separably within one end of said shell, and means for securing said ring within said shell, whereby said shaft may be removed from the shell and carry with it said balls and its races in undisturbed condition of adjustment.

3. In a ball-bearing, the combination, substantially as set forth, of a shell, a shaft, a V-grooved ball-race having sliding engagement with said shaft, a series of balls engaging said race, a ring screwed within the end of said shell and carrying a member of an exterior V-grooved ball-race engaging said balls, and a ring carrying the second member of said exterior ball-race and screwed to said first-mentioned ring and having a periphery fitting within the shell inwardly beyond the first-mentioned ring, whereby said exterior ball-races may be removed from one end of said shell.

ELDER F. OBENCHAIN.

Witnesses:
CHARLES E. KREIDER,
JOHN H. SMITH.